(12) United States Patent
Srinivasan et al.

(10) Patent No.: US 12,339,867 B1
(45) Date of Patent: Jun. 24, 2025

(54) DATA MANAGEMENT IN A LARGE SCALE DISTRIBUTED CLOUD SERVICE

(71) Applicant: Salesforce, Inc., San Francisco, CA (US)

(72) Inventors: Sudhir Srinivasan, Fremont, CA (US); Siddhesh Krishnan, Seattle, WA (US); Katsuyuki Hiura, San Francisco, CA (US); Deepak Kenchammana-Hosekote, Mountain View, CA (US); Amber Sahdev, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 16 days.

(21) Appl. No.: 18/426,552

(22) Filed: Jan. 30, 2024

(51) Int. Cl.
*G06F 16/25* (2019.01)
*G06F 16/22* (2019.01)
*G06F 16/2455* (2019.01)

(52) U.S. Cl.
CPC ........ *G06F 16/254* (2019.01); *G06F 16/2237* (2019.01); *G06F 16/24556* (2019.01)

(58) Field of Classification Search
None
See application file for complete search history.

(56) References Cited

U.S. PATENT DOCUMENTS

| | | | | |
|---|---|---|---|---|
| 9,154,908 B2* | 10/2015 | Bahl | ............... | H04W 4/029 |
| 9,164,969 B1* | 10/2015 | Gumaste | ............... | G06F 30/30 |
| 9,215,512 B2* | 12/2015 | Cohen | ............... | H04N 21/8355 |
| 11,971,874 B2* | 4/2024 | Padmanabhan | ......... | H04L 67/10 |
| 12,099,770 B1* | 9/2024 | Bakshi | ................ | H04L 67/306 |
| 12,212,654 B2* | 1/2025 | Das | ............... | H04L 9/50 |
| 2002/0156932 A1* | 10/2002 | Schneiderman | ........ | H04L 67/34 719/317 |
| 2018/0293823 A1* | 10/2018 | Gillot | ............... | G07C 9/00309 |
| 2024/0195847 A1* | 6/2024 | Mourachov | ......... | H04L 65/1089 |
| 2024/0272969 A1* | 8/2024 | Crouse | ................ | H04L 51/212 |
| 2024/0338378 A1* | 10/2024 | Setlur | ................ | G06F 16/243 |
| 2025/0077916 A1* | 3/2025 | Ali | ............... | G06N 5/046 |
| 2025/0086591 A1* | 3/2025 | Chan | ............... | G06T 17/00 |

* cited by examiner

*Primary Examiner* — Eliyah S. Harper
(74) *Attorney, Agent, or Firm* — Butzel Long

(57) ABSTRACT

A computer-implemented method is disclosed for storing source data related to targeted and untargeted tenants on several publishing servers. The method includes sending metadata related to a first part of the source data related to the targeted tenants from the publishing servers to an aggregating server and storing the metadata in a first database including metadata segments arranged in a first sequenced array and having corresponding state-indicating cursors arranged in a second sequenced array beginning with a first cursor and ending with a last cursor. The method also includes storing the second sequenced array on a second database, querying the first cursor of the second sequenced array from a subscribing server including targeted data related to at least a part of the tenants, querying the metadata segment corresponding to the first cursor, and performing a predetermined operation on at least a part of the targeted data.

23 Claims, 9 Drawing Sheets

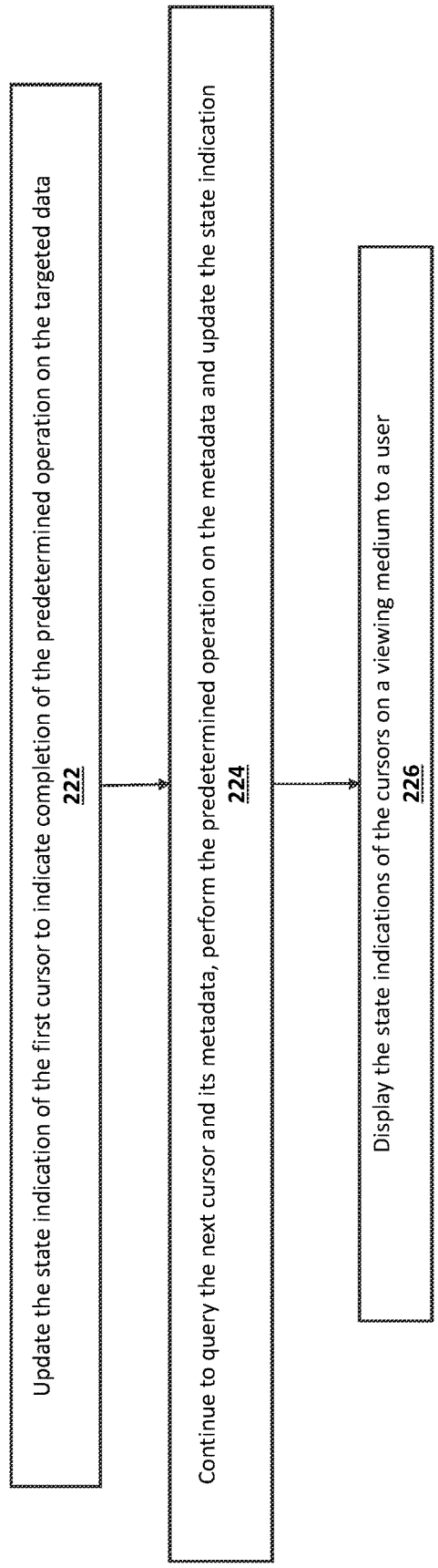

DATA MANAGEMENT IN A LARGE SCALE DISTRIBUTED CLOUD SERVICE

BACKGROUND

The present disclosure relates to providing a centralized framework for managing data related to a number of organizations (referred to as "tenants") in a business enterprise.

Large-scale global enterprises typically store data about multiple organizations within the enterprise on distributed storage servers located in multiple geographical locations. These storage servers store large amounts of data, often in the range of 200 petabytes or more, and the data is stored in a globally distributed manner. Owing to enterprise business processes such as tenant migrations, sandboxes, instance refreshes and the like, there is continuous movement of data over the distributed storage servers. Having an up-to-date organizational inventory is critical for internal and external processes to ensure that data corresponding to non-functional (referred to as "attrited") tenants is removed from all servers on time and to provide insight into the deletion and other update status of tenant attrition data. Existing methods, however, do not provide a continuous and complete process of managing data related to the functional and non-functional organizations across physical locations of the storage servers. Therefore, there exists a need for accurately managing and displaying data related to all the functional and non-functional organizations in a timely and trackable manner.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 2B is a flow diagram illustrating a method for managing data related to a number of tenants in a public cloud network.

DETAILED DESCRIPTION

Figure 1A:
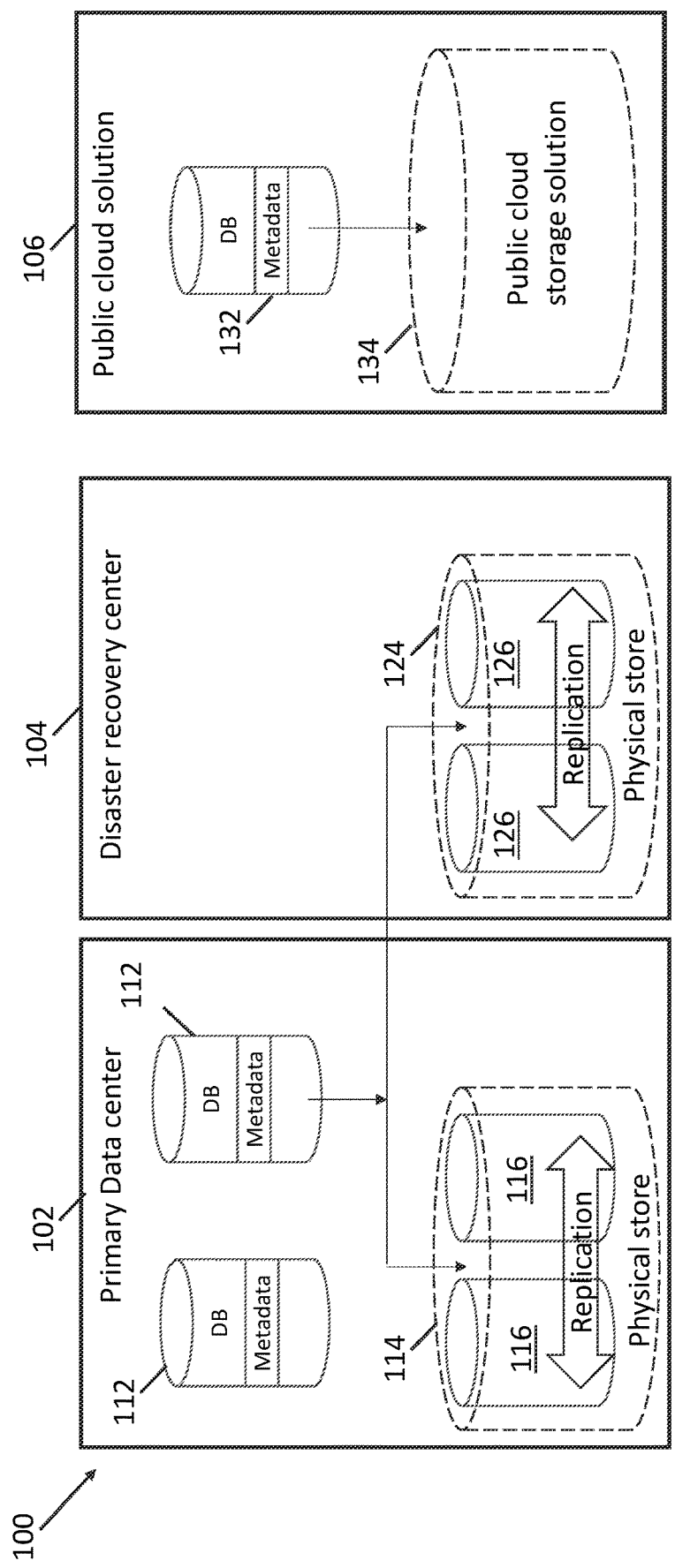
FIG. 1A is a block diagram illustrating an example distributed data storage system for managing data related to a number of tenants in a public cloud network.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments of the present disclosure describe a method and system for building a centralized architecture in an otherwise peer-to-peer-like network with no pre-existing central coordinator, by introducing a process-central, aggregating server. The aggregating server is communicatively connected with a number of pre-existing storage servers (also referred to as "publishing servers") that are distributed over several geographical locations, and further with a number of pre-existing infrastructure servers (also referred to as "subscribing servers"). The centralized architecture is designed to ensure that data related to tenants that have already become non-functional, are deleted in a continuous manner on all servers. The centralized architecture further ensures that the data deletion process is completed without any exception. The method and system of the proposed solution further enable tracking the progress, speed, compliance and other statistical parameters of the data deletion process.

In an aspect of the disclosed subject matter, a computer-implemented method is disclosed. The computer-implemented method may include storing source data related to a number of tenants on a number of publishing servers. The number of tenants may include targeted tenants and untargeted tenants, and the number of publishing servers may include servers distributed over a number of geographical locations. The method also includes sending metadata related to at least a first part of the source data related to the targeted tenants from the publishing servers to an aggregating server communicatively connected with the publishing servers. The method further includes storing the metadata in a first database on the aggregating server. The first database includes a number of metadata segments arranged in a first sequenced array beginning with a first metadata segment and ending with a last metadata segment. The metadata segments may have a corresponding number of state-indicating cursors arranged in a second sequenced array beginning with a first cursor and ending with a last cursor. The method also includes storing the second sequenced array on a second database on the aggregating server and querying the first cursor of the second sequenced array from a subscribing server communicatively connected with the aggregating server. The subscribing server may include targeted data related to at least a part of the number of tenants. The method further includes querying the metadata segment corresponding to the first cursor, from the subscribing server and performing a predetermined operation on at least a part of the targeted data on the subscribing server, based on the queried metadata segment.

The performing a predetermined operation on at least a part of the targeted data on the subscribing server may include deleting the at least a part of the targeted data on the subscribing server.

The method also includes reporting the state indications of the cursors, and a number of statistical parameters associated with the state indications of the cursors to a process monitoring server communicatively connected with the aggregating server.

The method also includes updating the state indication of the first cursor to indicate completion of the predetermined operation on the at least a part of the targeted data on the subscribing server. The method further includes continuing, from the subscribing server, to query the next cursor, query the metadata segment corresponding to the next cursor, perform the predetermined operation on the queried metadata segment, and update the state indication of the next cursor, until the last cursor is reached and displaying the state indications of the cursors on a viewing medium to a user.

The method also includes sending metadata related to at least a second part of the source data from the number of publishing servers and extracting, cleaning, normalizing, converting, and formatting the metadata records into output data records of a predetermined format. The method further includes storing the output data records on the cloud server database and generating a global view of an inventory of the tenants based on the output data records. The global view includes current status of the targeted tenants and the untargeted tenants. The method further includes displaying the global view of the inventory of the tenants on a viewing medium to the user.

The extracting, cleaning, normalizing, converting, and formatting the metadata records may include running an Extract-Transform-Load (ETL) job on the metadata records using a predetermined data service.

The generating a global view of an inventory of the tenants may include presenting the inventory of the tenants indexed by corresponding physical locations of the storage servers.

In an aspect of the disclosed subject matter, a non-transitory machine-readable storage medium is disclosed that provides instructions that, if executed by a processor, are configurable to cause said processor to perform operations and methods for storing and managing source data related to a number of tenants in a public cloud network as disclosed herein.

In an aspect of the disclosed subject matter, a system is disclosed for storing and managing source data related to a number of tenants in a public cloud network. The system may include a computer processor configured to run a public cloud network digitally connected with the computer processor. The public cloud network includes distributed storage servers that store information related to the tenants. The system may also include a non-transitory machine-readable storage medium that provides instructions that are configurable to cause the apparatus to perform any of the methods disclosed herein.

FIG. 1A is a block diagram illustrating an example distributed data storage system 100 for managing data related to a number of tenants in a public cloud network cloud network. The data related to the tenants may be stored in a globally distributed manner spanning multiple data centers in a high-availability configuration. On a read/write operation, the system 100 may first write locational metadata into the database, and then it may read or write the actual data chunk from/into physical stores along with the tenant ID that the data belong to. Thus, the metadata may serve as the authoritative store for reading or writing operations to locate the physical data.

In the context of globally distributed large-scale data, metadata refers to the data that is collected and transmitted by various devices or systems in order to provide information about their status, performance, or other relevant metrics. This data is used to monitor and understand the behavior of these systems in real-time, and to make decisions about how to optimize their performance or troubleshoot issues.

The distributed data storage system 100 includes a primary data center 102 and a disaster recovery data center 104. The primary data center 102 includes one or more storage servers 112 and a physical store 114. A distributed storage server is a type of data storage system in which data is spread across multiple servers, rather than being stored on a single server. This allows for increased scalability, reliability, and fault tolerance, as the failure of one server does not result in the loss of all data. The storage server may be a set of logical processes distributed over a number of geographical location or operating on a cloud network or the like. The physical store 114 includes one or more file server 116. The file servers 116 include data chunks that include tenant ID data files and details like that. The storage servers 112 and the file servers 116 may be replicated from respective original instances. The one or more storage servers 112 and the file servers 116 may be connected by a catalog of metadata that maps data to the physical stores 114.

Referring to FIG. 1A again, the disaster recovery data center 104 includes a physical store 124. The physical store 124 includes one or more file server 126 that includes data chunks which describe tenant ID data file and information like that. The distributed data storage system 100 may include one or more public cloud service 106 that includes a cloud storage server 132 and a physical store 134. The physical store 134 may include data chunks which describe tenant ID data file and information like that.

Figure 1B:
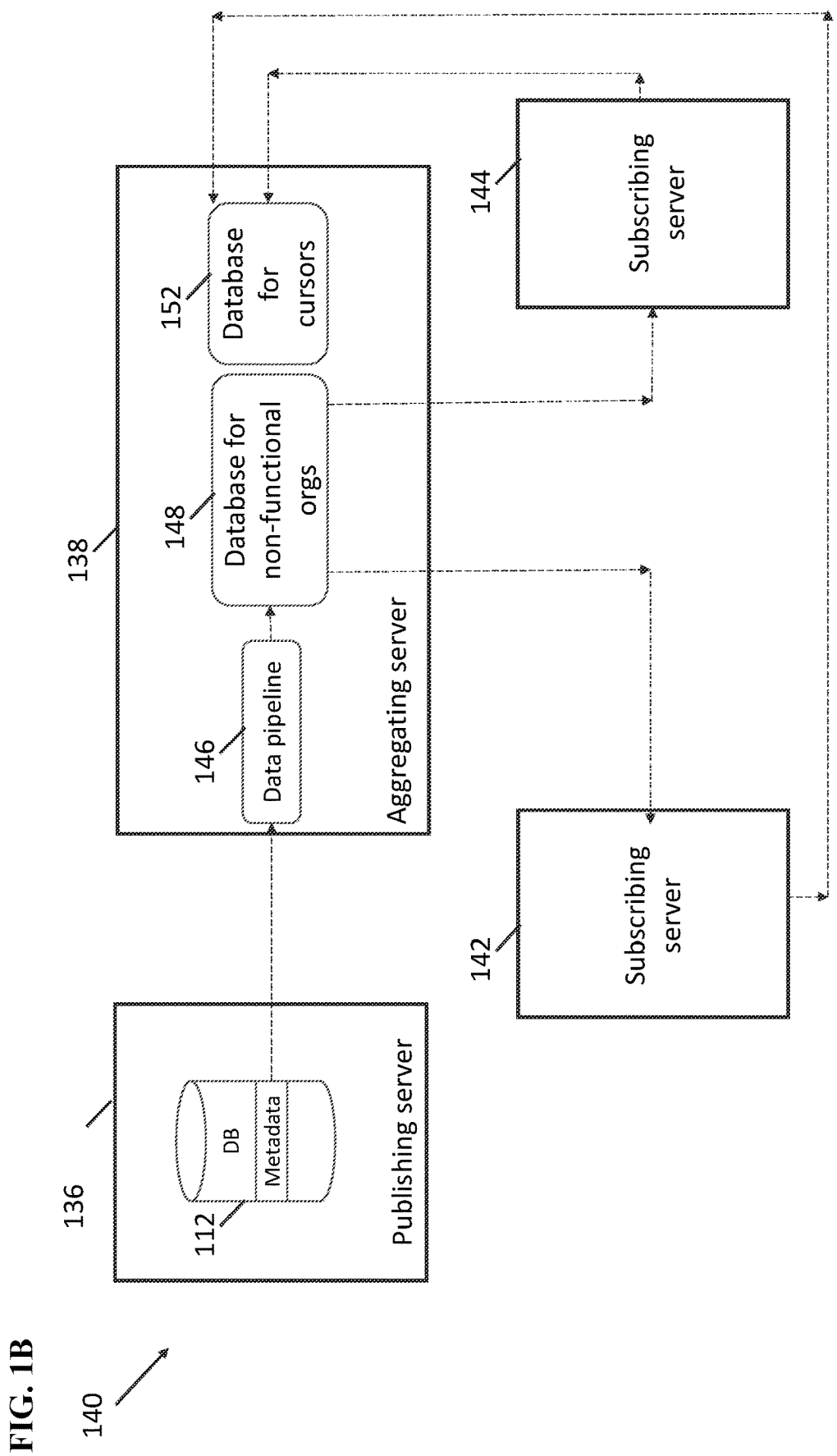
FIG. 1B is a block diagram illustrating a system for managing data in a continuous manner, as described with respect to the system of FIG. 1A.

FIG. 1B is a block diagram illustrating a system 140 for managing data in a continuous manner, as described with respect to the system of FIG. 1A. The system 140 includes a number of publishing servers 136 digitally connected with a processor (not shown). The publishing servers 136 include storage servers 112 (of FIG. 1A) distributed over a number of geographical locations. The system 140 also includes an aggregating server 138 communicatively connected with the publishing servers 136. The aggregating server 138 is a process-central server that is functionally designed to centralize an otherwise peer-to-peer-like network with no pre-existing central coordinator. An example aggregating server may be implemented in the same AWS or other cloud system as the publishing servers and in that case, they may not be traditional separate physical "servers." An aggregating server typically receives metadata related to the targeted tenants sent out from the of publishing servers and stores the metadata in a database that includes metadata segments arranged in a first sequenced array typically beginning with a first metadata segment and ending with a last metadata segment. The metadata segments may have corresponding state-indicating cursors arranged in a second sequenced array typically beginning with a first cursor and ending with a last cursor.

The system 140 also includes a number of subscribing servers 142 and 144 communicatively connected with the aggregating server 138. Subscribing servers 142 and 144 are distributed infrastructure servers that are configured to store targeted data related to at least a part of the tenants. A subscribing server may be used to query the first cursor of the second sequenced array, query the metadata segment corresponding to the first cursor, and perform a predetermined operation such as deletion of information related to the targeted tenants, based on the queried metadata segment.

The tenants referred to in FIGS. 1A and 1B, and throughout the rest of this disclosure, may include functional and non-functional tenants. As is commonly known in the networking art, a functional tenant is a logical grouping of resources within a cloud provider's infrastructure that is dedicated to a specific organization or user. These resources may include virtual machines, storage, and networking resources, and are isolated from other tenants to ensure security and stability. A non-functional tenant, on the other hand, is a logical grouping of resources within a cloud provider's infrastructure that has ceased from being dedicated to a specific organization or user, but these resources are not isolated from other tenants yet. Non-functional tenants may typically be used for testing and development, or for organizations that have a shared security model.

Referring to FIG. 1B, source data related to a number of tenants may be stored on the publishing servers 136 and the tenants may include targeted tenants and untargeted tenants. Targeted tenants are those that are selected and targeted for performing predetermined operations such as deletion, update, merge and the like. Conversely, untargeted tenants are those that are not selected or targeted for any kind of action on. The publishing servers 136 typically send out metadata related to at least a first part of the source data related to the targeted tenants to the aggregating server 138.

The metadata sent out by the publishing servers 136 may be ported through a cloud data pipeline 146 and then stored in a first database 148 on the aggregating server 138. A cloud data pipeline 146 is a set of tools and processes that allows for the efficient and automated movement of data between different systems, typically including data storage, processing, and analytics. It allows for the seamless integration of data from multiple sources, both within and across different geographic regions, and the ability to easily scale to meet changing demands.

The first database 148 may include a number of metadata segments arranged in a first sequenced array beginning with a first metadata segment and ending with a last metadata segment. The metadata segments may have a corresponding number of state-indications (referred to as "cursors") arranged in a second sequenced array beginning with a first cursor and ending with a last cursor. The second sequenced array may be stored on a second database 152 on the aggregating server 138.

The subscribing servers 142 or 144 may be used to query the first cursor of the second sequenced array. The subscribing server 142 or 144 may include targeted data related to at least a part of the number of tenants. The subscribing server 142 or 144 may be used to query the metadata segment corresponding to the first cursor and perform a predetermined operation on at least a part of the targeted data on the respective subscribing server 142 or 144, based on the queried metadata segment. In an embodiment, the predetermined operation on at least a part of the targeted data on the subscribing server may include deleting the at least a part of the targeted data on the subscribing server. In an instance, the state indications of the cursors, and a number of statistical parameters associated with the state indications of the cursors may be reported to a process monitoring server (not shown) communicatively connected with the aggregating server 138.

Figure 1C:
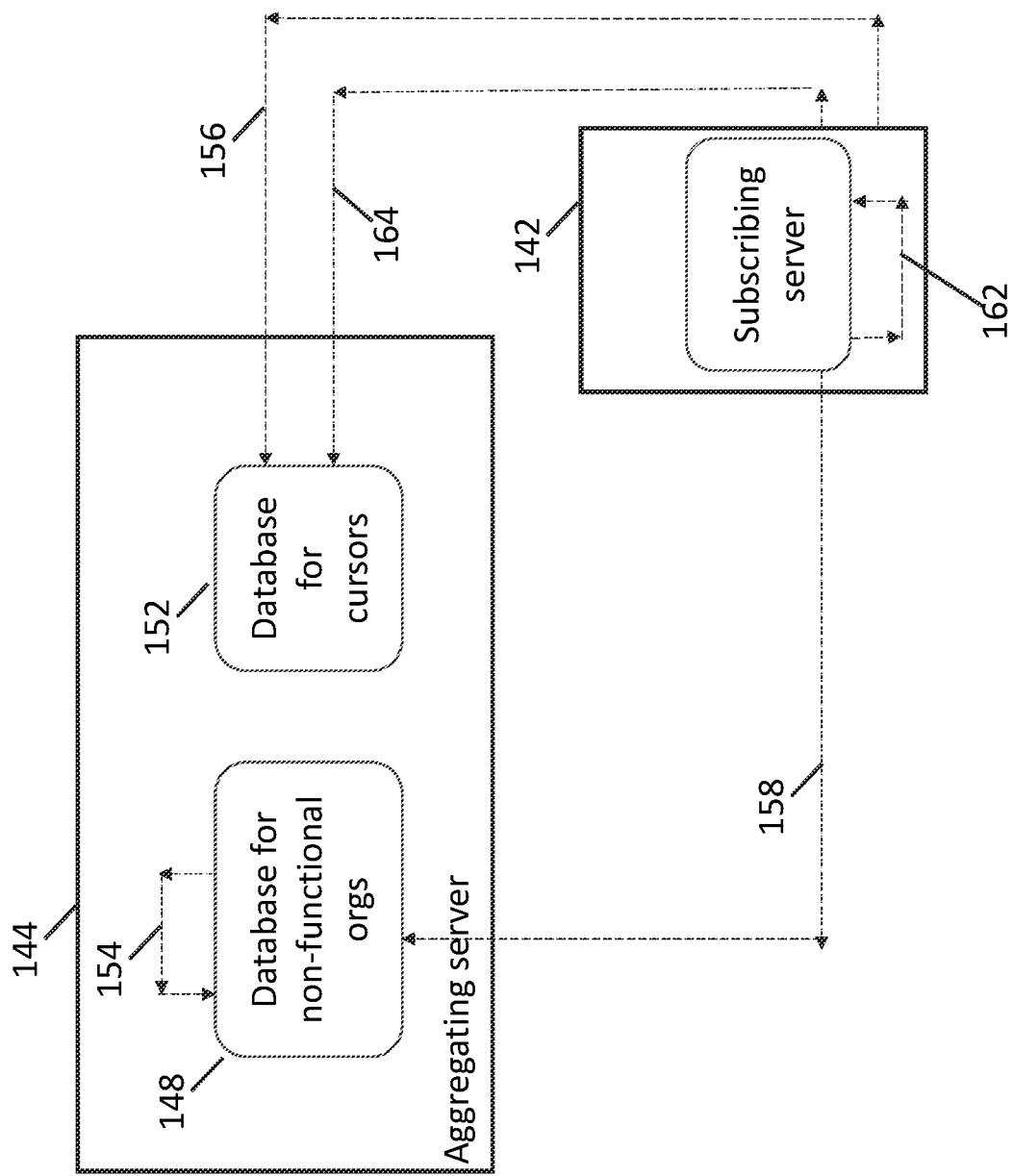
FIG. 1C is a block diagram illustrating a system for tracking the progress of data management, as described with respect to the system of FIG. 1A.

FIG. 1C is a block diagram illustrating a system 150 for tracking the progress of data management, as described with respect to the system of FIG. 1A. The first database 148 may store a number of metadata segments in a first sequenced array on the aggregating server 138. Further, the metadata segments may have a corresponding number of state-indicating cursors arranged in a second sequenced array stored on a second database 152 on the aggregating server 138. In operation, the metadata segments may be arranged in the first sequenced array beginning with a first metadata segment and ending with a last metadata segment, as in 154. In a similar manner, the second sequenced array may be arranged beginning with a first cursor and ending with a last cursor.

At an example instant of time, the state indication of an example last cursor may be updated to indicate completion of the predetermined operation on at least a part of the targeted data on the subscribing server 142, as in 156. Then, responsive to an example first query from the subscribing server 142, as in 158, one or more responses may be provided from the aggregating server 138. The response from the aggregating server 138 may include an example first cursor of the second sequenced array and a metadata segment corresponding to the first cursor. The first cursor and metadata segment may be sufficient for a recipient of the one or more responses to delete at least a part of the targeted data based on the metadata segment, as in 162. Subsequently, the state indication of the first cursor may be updated to indicate completion of the deletion process performed on the at least a part of the targeted data on the subscribing server, as in 164.

Further, responsive to a second query from the subscribing server 142, a second response may be provided from the aggregating server 138. The second response from the aggregating server 138 may include a next cursor of the second sequenced array and a metadata segment corresponding to the second cursor. The second cursor and the metadata segment corresponding to the second cursor may be sufficient for the recipient of the second response to delete at least another part of the targeted data. This repetitive steps may continue until the last cursor is reached. At that point, the state indications of the cursors may be displayed on a viewing medium to a user.

In effect, segmenting metadata into a predictable sequence of smaller chunks, and processing this segmented data on all servers and storing the server's state (referred to as "cursor") into a centralized location makes it easy for monitoring and verification a deletion process. In an instance, an example naming scheme for the metadata segments may be chosen so that the names are deterministically incremental, i.e., a series where every subsequent element has a determinable name. Examples of such series may be chronological, expressed in dates, hours, minutes and seconds, or any other monotonically increasing mathematical series. Reporting and storing a predictable sequence of cursors in a central location helps avoid reprocessing data in case of server failures, track trends and the progress of an expansive fleet, and establish accuracy and compliance of process in a large system.

Further, the centralized architecture of the present disclosure enables an efficient way to monitor progress through a fleet of storage servers that may be processing data at a variable rate. For example, finding the minimum of cursors within all cursors may provide information on what partition of data has the entire fleet has caught up to, finding the median of cursors within all cursors may help calculate several compliance metrics (such as whether more than 99% of the fleet processed some requisite time-sensitive data), etc. The numerous monitoring and compliance use cases are additional advantages of the centralized architecture that help establish accuracy and efficient progress through the data management process.

Figure 1D:
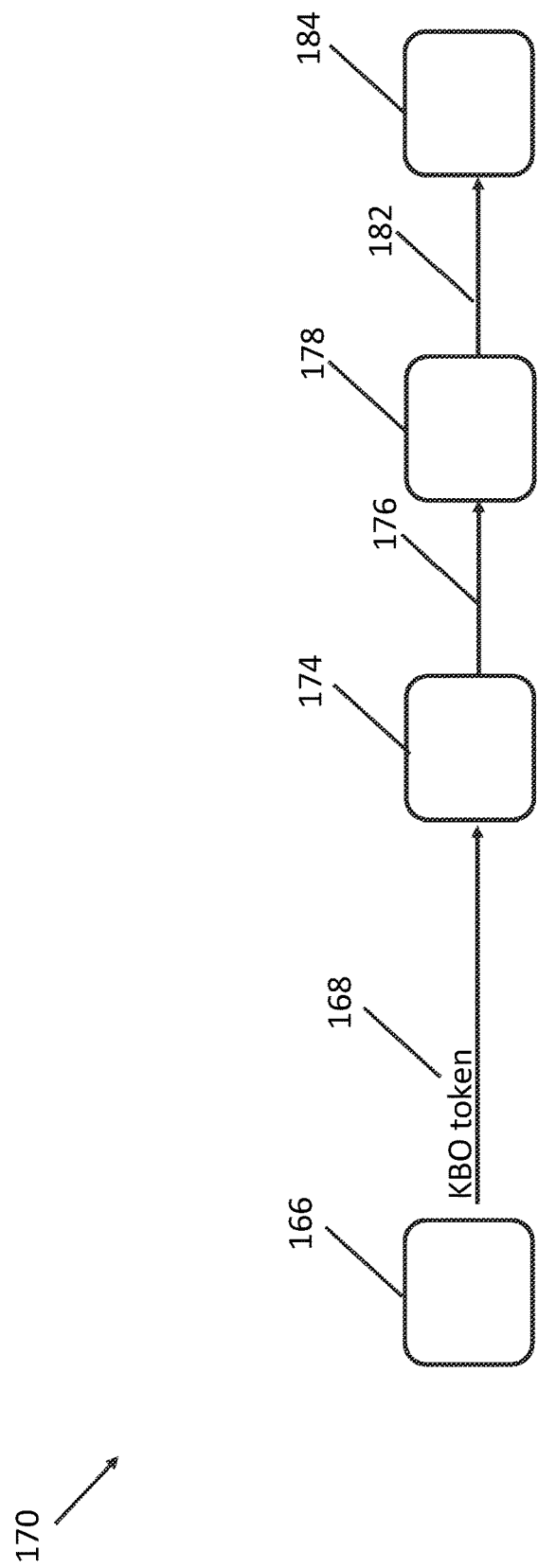
FIG. 1D is a block diagram illustrating a system for managing data in a complete manner, as described with respect to the system of FIG. 1A.

FIG. 1D is a block diagram illustrating a system 170 for managing data in a complete manner, as described with respect to the system of FIG. 1A. As mentioned above, many of the public cloud servers typically store operation-critical data in planet scale, multi-tenant, large scale distributed servers that source customer data and power the several core applications. The data in the storage servers are typically stored in a globally distributed manner and a single server may have data from multiple tenants. Organizational business processes such as tenant migrations, sandboxes, and instance refreshes result in continuous movement of data in the storage servers. Organizational migration refers to relocating a customer org from one physical/metadata store to another one. Sandbox refers to creating a read-only copy in a different physical/metadata store, and writing new data in the copy.

Embodiments of the present disclosure describe a method and system for storing source data related to the tenants on the distributed storage servers. The source data relate to several functional and non-functional tenants of the business enterprise. Metadata related to at least a part of the source data may be sent from the storage servers and processed through a cloud data pipeline comprising multiple data services. The processed data is then stored as metadata records on a cloud server database. The metadata records are subsequently transformed into tenant inventory records. The tenant inventory records are used to generate a global view of the inventory of the tenants, which includes the active status of functional tenants and deletion status of non-functional tenants. This global view is displayed to a user on a viewing medium.

As is commonly known in cloud service network art, a data service (or cloud data service) is a service offered by cloud providers that allows for the storage, management, and processing of large amounts of data in the cloud. These services provide the ability to easily store and process data in multiple geographic regions, while also providing scalability, reliability, and security. These services are designed to integrate with other cloud-based services and tools, such as data pipelines and machine learning, to make it easy to work with globally distributed large-scale data.

A cloud server database is a database that is hosted on a cloud server rather than on-premises. Cloud server databases are designed to handle large amounts of data and provide scalability, high availability, and fault-tolerance. They are often used in a globally distributed setup, where data is stored across multiple geographic regions for better performance, data security and for compliance with data-residency regulations.

In the context of globally distributed large-scale data, a global view refers to an overall, high-level perspective of the data that is currently available across multiple locations. This view allows one to quickly and easily understand the overall state of the data, including where it is located, how it is being used, and any issues or trends that may be present.

As a result, the storage servers do not provide a global view of all the physical server locations where a functional (also referred to as "live") tenant's data are stored. With this movement of data, business enterprises need a mechanism to exactly track where the data for a tenant has moved, and where specifically that reside. Having this tenant data inventory helps answer the question on whether all data related to non-functional tenants have been completely and successfully deleted from all server of the business enterprise.

Given a large-scale, multi-tenant, distributed storage service having data movements, the embodiments of the present disclosure provide a system and a method for building a ground-up global view of the live customer/tenant data: a single-pane-of-glass view of all the actual physical servers where an org's data is stored. The solution is efficient in terms of handling scale of data, and offering a low-latency solution. Having an up-to-date global view of the organizational inventory provides an insight into the deletion status of organizational attrition data.

Referring to FIG. 1D, the system 170 includes a number of cloud client storage servers 166. The storage servers 166 may be distributed over a number of geographical locations. As is commonly known in the networking art, a distributed storage server is a type of data storage system in which data is spread across multiple servers, rather than being stored on a single server. This allows for increased scalability, reliability, and fault tolerance, as the failure of one server does not result in the loss of all data. Examples of distributed storage systems may include Hadoop HDFS, Google File System (GFS), and GlusterFS.

Of all the tenants served by the storage servers 166, a first group of tenants may include functional tenants. In the context of globally distributed large-scale data, a functional (also referred to as "live") tenant refers to a system that is able to actively manage and update data in real-time, as opposed to a system that only allows for batch updates. Conversely, a second group of the tenants may include non-functional tenants. A non-functional (also referred to as "attrited") tenant refers to a system that is not able to actively manage and update data in real-time, and instead rely on batch updates. This means that new data can be added, existing data can be modified, and old data can be removed only with significant delay.

Referring to FIG. 1D, metadata related to at least a part of the source data may be sent from the distributed storage servers 166. In an embodiment, the metadata may include data related to the data stored on the distributed servers 166. In an embodiment, utility tokens 168 may be used to send out the metadata from the distributed storage servers 166. Utility tokens are digital assets, or cryptocurrency, that represent a unit of value within a specific blockchain platform and serves as the primary currency of a blockchain network. In general, utility tokens 168 are cryptocurrency that may be used to facilitate transactions, rewards network contributors and used for governance in blockchain network. Utility token 168 may be used for a variety of purposes, such as representing ownership in a company or tenant, acting as a medium of exchange within a specific ecosystem, or as a means of accessing certain services or products. It also serves as an incentive for nodes that contribute to a network's security and stability. The token also plays a role in the governance of the network, with holders able to vote on protocol upgrades and other decisions.

In operation, the distributed storage servers 166 typically publish raw data, which may be collected and processed using the utility token 168, into the first data service 174 (for example, AWS Kinesis Data Stream). The first data service 174 may collect data from various sources and coalesce it into a single stream, enabling consumption of the data stream by the second data service 178 for further processing. This data can be any relevant streaming data, such as application logs, backend events, "Internet of Things" (IoT) metadata, and the like. For instance, in one of the use cases, deleted customer identifiers from many servers may be published (i.e., output of 166), coalesced into a unified stream (output of 174), and then processed and enhanced by the second data service 178. The second data service 178 may add relevant metadata, such as time and origin server information. The processed output, represented by the second data output (182), may then be stored in the cloud server database 184.

To elaborate further, the metadata from the distributed servers 166 may be ported further through a number of data services. The data services of system 170 may include a first data service 174 that processes the source data 168 from the distributed servers 166 and produces a first data output 176. The first data service 174 may be a fully managed service, such as Amazon Kinesis Data Streams employed for real-time processing of streaming data at massive scale. The first data service 174 may allow a user to collect, process, and analyze data in real-time, respond quickly to new information. The first data service 174 may be used to ingest, buffer, and process streaming data such as application logs, website clickstreams, and "Internet of Things" (IoT) metadata, in a highly available and durable manner.

Referring back to FIG. 1D, the data services of system 170 may further include a second data service 178 and the processing the metadata may include processing the first data output 176 using the second data service 178 and producing a second data output 182. The second data service 178 may be a fully managed service, such as Amazon Kinesis Data Firehose, employed for delivering real-time streaming data to destinations such as Amazon Simple Storage Service (S3), Amazon Redshift, Amazon Elasticsearch Service (ES), and Splunk. The second data service 178 typically simplifies the first data output stream and may be used for streaming data into data lakes, data stores, and analytics tools. Further, the second data service 178 may automatically scale to match the throughput of data and requires no ongoing administration. The second data service 178 may also convert and process data on the fly before delivering it to the destination, which is useful for tasks such as data transformation and enrichment.

The processed output data stream 182 may be stored as metadata records such as JSON records, on a cloud server database 184. The cloud server database 184 may be a cloud-based search service offered by Amazon Web Services (AWS). The cloud server database 184 may be a fully managed service that makes it easy for developers to add search functionality to their applications and websites. In this case, the developers may be able to index, search, and analyze their data using simple API calls to the cloud server database 184, without underlying infrastructure or scaling issues.

In operation, each physical server (where the tenant data is stored) may periodically send out metadata corresponding to the data that it stores. Each of the physical servers (on 1P/Falcon) essentially sends a mapping of the active tenantIds that it has to the "TenantMap" Kinesis stream. This job may be run on a daily frequency and the data is sent out to the first data service 174, the second data service 178 and then stored on the cloud server database 184.

Figure 1E:
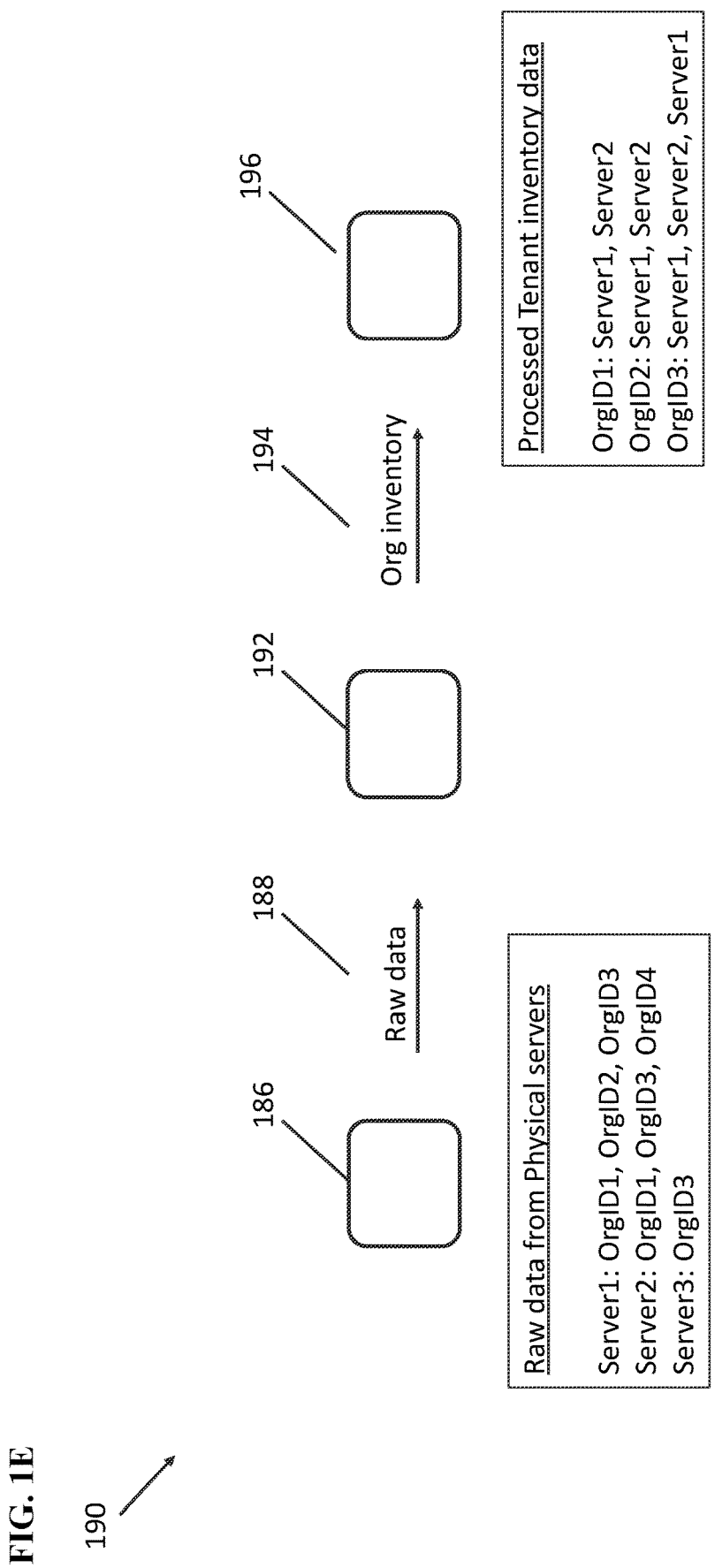
FIG. 1E is a block diagram illustrating a system for managing data in a complete manner, as described with respect to the systems of FIG. 1A and FIG. 1D.

FIG. 1E is a block diagram illustrating a system 190 for managing data in a complete manner, as described with respect to the systems of FIG. 1A and FIG. 1D. The metadata records 188 may be transformed into tenant inventory records 194 by employing an Extract-Transform-Load (ETL) process 192. ETL jobs are typically used for data integration and data warehousing, and are the foundation for many data-driven applications and business intelligence systems and includes extracting, cleaning, normalizing, converting, and formatting the metadata records using a third data service.

As is commonly known in the art, "Extract-Transform-Load" (ETL) is a process for moving data from one system to another. The process typically involves at least the steps of extracting, transforming, and loading. Extracting refers to a process where data is extracted from one or more sources, such as databases, files, or streaming data sources. The extracted data is typically in raw format and may not be in a format that is usable by the target system. The extracted data is subsequently transformed to make it usable by the target system. The transformation may involve cleaning and normalizing the data, converting data types, and applying calculations or other transformations. The transformed data is loaded into the target system, such as a data warehouse, data lake, or other data storage and processing system.

The third data service 192 may include a fully managed big data processing, analyzing, and scaling service. Amazon Elastic MapReduce (EMR) is a fully managed service for big data processing and analysis in the cloud. It uses the Hadoop and Spark frameworks to process and analyze large datasets in a distributed computing environment. Amazon EMR makes it easy to set up, operate, and scale big data processing clusters in the cloud. EMR may be used to process data stored in data lakes, data stores, and databases, as well as streaming data from sources such as Amazon Kinesis Data Streams.

The third data service 192 may include a serverless big data processing, analyzing, and scaling service. In another embodiment, this is a serverless compute service that lets one run code without provisioning or managing servers. It allows one to build event-driven, scalable, and fault-tolerant applications by running your code in response to specific events such as changes to data in an S3 bucket or a new line of a stream in Kinesis. With Lambda, a user can run code in multiple languages such as Node.js, Java, Python, C# and Go.

Referring to FIG. 1E, the tenant inventory records 194 are stored on the cloud server database 196 and a global view of an inventory of the tenants may be generated based on the tenant inventory records 194. The global view includes active status of the functional tenants and deletion status of the non-functional tenants. In the context of globally distributed large-scale data, a global view of live data refers to an overall, high-level perspective of the data that is currently available across multiple locations. This view allows one to quickly and easily understand the overall state of the data, including where it is located, how it is being used, and any issues or trends that may be present.

The global view of the inventory of the tenants may be displayed on a viewing medium to a user. The source data may include data related to the tenants presented as an inventory of the storage servers indexed by the tenants. The computer-implemented method may include generating a global view of an inventory of the tenants including presenting the inventory of the tenants indexed by corresponding physical locations of the storage servers.

Figure 2A:
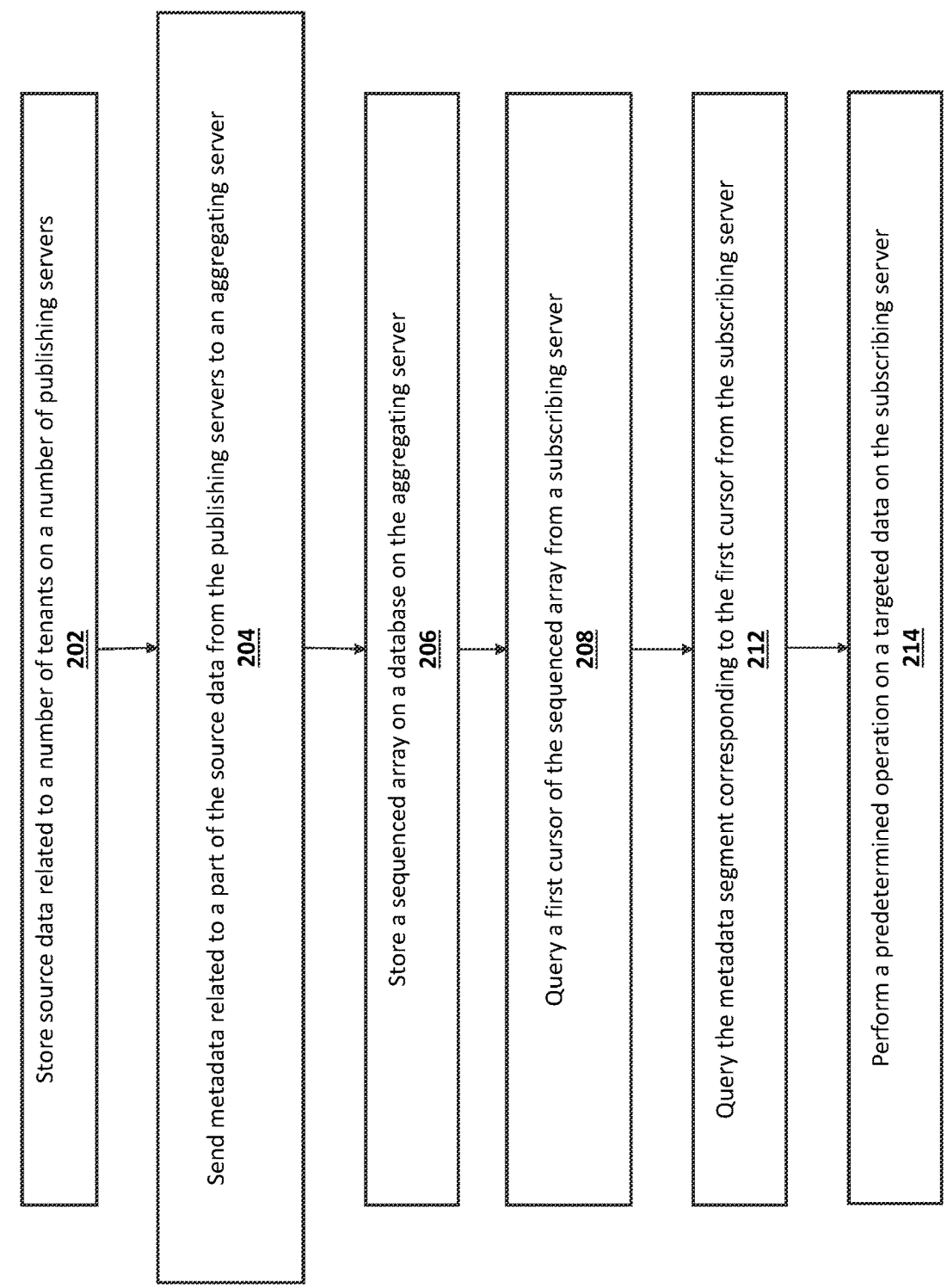
FIG. 2A is a flow diagram illustrating a method for managing data related to a number of tenants in a public cloud network.
Figure 3A:
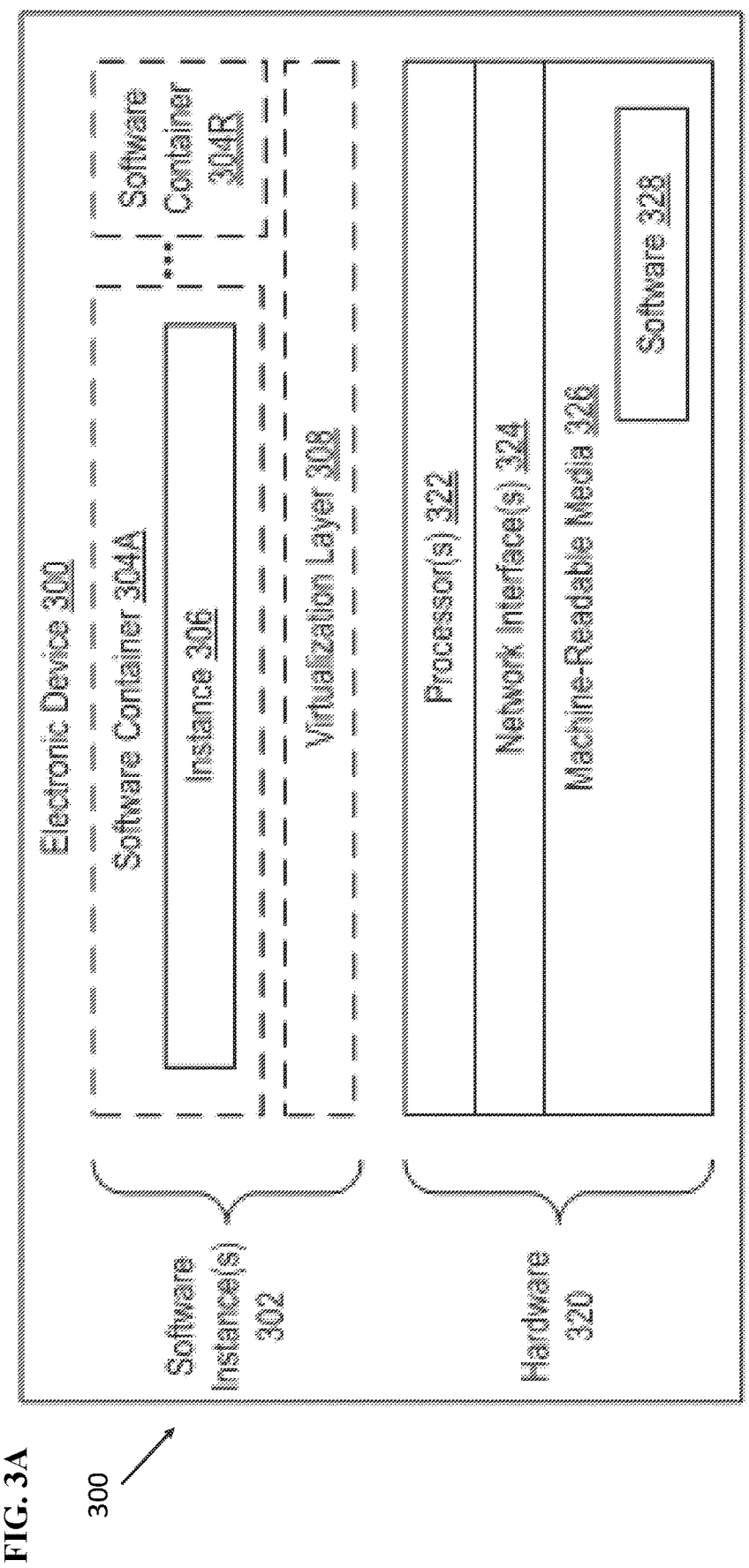
FIG. 3A is a block diagram illustrating an exemplary electronic device according to an example implementation.
Figure 3B:
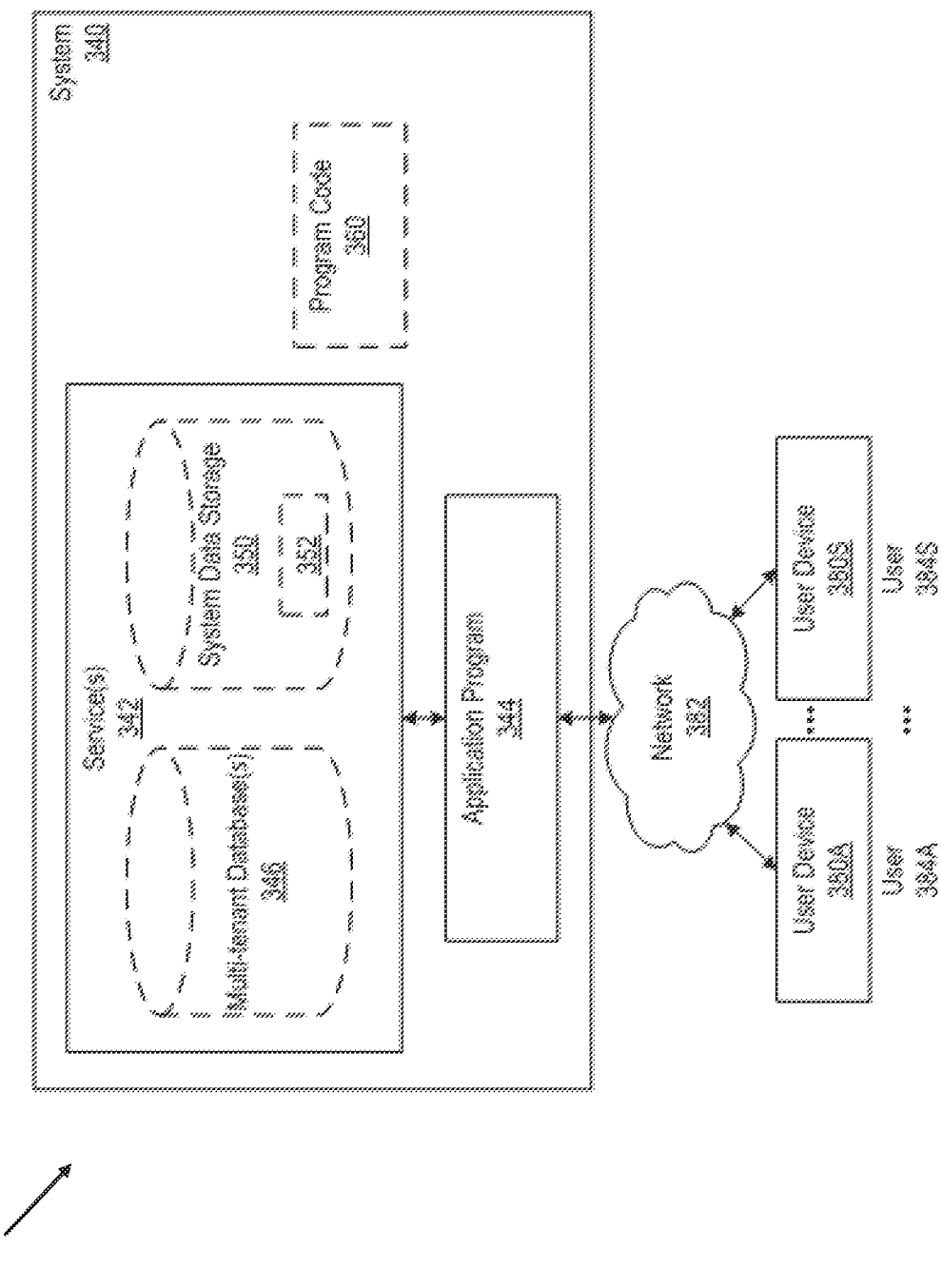
FIG. 3B is a block diagram of an exemplary deployment environment according to an example implementation.

FIG. 2A is a flow diagram illustrating a computer-implemented method 200, as disclosed herein. The method 200 may be performed, for example, by a system as shown in FIGS. 1A to 1C operating in conjunction with the hardware as shown in FIGS. 3A and 3B and/or by software executing on a server or distributed computing platform. Although the steps of method 200 are presented in a particular order, this is only for simplicity.

The computer-implemented method 200 may include, as in step 202, storing source data related to a number of tenants on a number of publishing servers. The number of tenants may include targeted tenants and untargeted tenants, and the number of publishing servers may include servers distributed over several geographical locations. At 204, metadata related to at least a first part of the source data related to the targeted tenants are sent out from the publishing servers to an aggregating server that is communicatively connected with the publishing servers. At 204, the metadata are stored on the aggregating server in a first database that includes a number of metadata segments arranged in a first sequenced array beginning with a first metadata segment and ending with a last metadata segment.

The metadata segments may have a corresponding number of state-indicating cursors arranged in a second sequenced array beginning with a first cursor and ending with a last cursor. At 206, the second sequenced array may be stored on a second database on the aggregating server. At 208, the first cursor of the second sequenced array may be queried from a subscribing server communicatively connected with the aggregating server. The subscribing server may include targeted data related to at least a part of the number of tenants. At 212, the metadata segment corresponding to the first cursor may be queries from the subscribing server and at 214, a predetermined operation may be performed on at least a part of the targeted data on the subscribing server, based on the queried metadata segment. The predetermined operation may include deleting the at least a part of the targeted data on the subscribing server. In one embodiment, the state indications of the cursors and a number of statistical parameters associated with the state indications of the cursors may be reported to a process monitoring server communicatively connected with the aggregating server.

FIG. 2B is a flow diagram illustrating a computer-implemented method 200, continued from FIG. 2A. At 222 the state indication of the first cursor may be updated to indicate completion of the predetermined operation on the at least a part of the targeted data on the subscribing server. At 224, querying the next cursor, querying the metadata segment corresponding to the next cursor, performing the predetermined operation on the queried metadata segment, and updating the state indication of the next cursor may be continued, from the subscribing server, until the last cursor is reached. At 226, the state indications of the cursors may be displayed on a viewing medium to a user.

The metadata records are transformed into tenant inventory records. The EMR job performs the "Map Reduce" operation of the metadata as follows and details of the amazon transformation process are described in an example below:

Input Files and Format:

As described earlier, each physical server (where the tenant data is stored) may periodically send out metadata corresponding to the data that it stores with the following format:

{
"host": "<hostName>",
"timeStamp": <epochTime>,
"tenantIds": [<listOfTenantIds>]
}

Here, "<listOfTenantIds>" is the comma separated list of tenant IDs, for example "tenantId-1", "tenantId-2" etc. The "hostName", for example, "host-1", "host-2" etc., is the name of the physical host where the data corresponding to an tenant ID is stored. The metadata may be sent to the cloud pipeline's Kinesis data stream, and stored in a database (ElasticSearch/OpenSearch) service as JSON records as shown in the above format.

Record Reading and Mapping:

The recordReader reads the JSON records from ElasticSearch service and emits <key, value> pairs. The "key" is the actual "hostName", and the "value" is the <listOfTenantIds> as previously described.

key: "<hostName>", value: [<listOfTenantIds>]

For example:

"host-1": ["tenantId-1", "tenantId-2", "tenantId-3"]

The mapping step then expands the <value> part, and converts the <key, value> pair into individual key-value pairs:

"tenantId-1": "host-1"
"tenantId-2": "host-1"
"tenantId-3": "host-2"
"tenantId-3": "host-4"
"tenantId-1": "host-2"
"tenantId-4": "host-3"

Shuffling:

The mapped records are shuffled/grouped by tenantIds, and keys with the same tenantId are sent to the same "reducer" nodes for further processing. For example, here is a possible arrangement of tenantIds on each reducer node in the EMR cluster:

ReducerNode-1: All <key, value> pairs for "tenantId-1"
ReducerNode-2: All <key, value> pairs for "tenantId-2", "tenantId-3"
ReducerNode-3: All <key, value> pairs for "tenantId-4"

Map Reducing:

The shuffled/grouped records are combined based on the key in each reducer, in order to produce the unique "hostList"/"locationList" for each of the tenantIds. Using the above example:

ReducerNode-1: "tenantId-1": ["host-1", "host-2"]
ReducerNode-2: "tenantId-2": ["host-1"], "tenantId-3": ["host-2", "host-4"] ReducerNode-3: "tenantId-4": ["host-3"]

Querying:

The transformed data in the may be queried to assure that the desired format has been generated.

The combined records from each of the reducer nodes are stored in the database. Thus, a ready mapping of tenant-IDs to all locations/hosts is obtained where a tenant's data is stored. This mapping may be queried and displayed in a global view that may answer questions related to addition or attrition of tenants with ease at low latency.

Referring to FIGS. 1A, 1B, 1C, 2A, and 2B, each of the physical stores in the distributed storage servers 102 runs a periodic job, and sends out metadata on the tenantIds that it includes. This data is ported, processed and stored in cloud server database 132. Further, the raw data from each of the physical stores is processed by an ETL job running on a data processing service. The ETL job reverse-indexes the data into the "tenant data inventory", which is stored in cloud server database 132 as well. Thus, a ready mapping of tenant-IDs to all locations is obtained where a tenant's data is stored. This can be queried and displayed to provide a global view of an inventory of the functional and the non-functional tenants.

Given a large-scale, multi-tenant, distributed storage service having data movements, this solution builds a ground-up global view of the live customer/tenant data: a single-pane-of-glass view of all the actual physical servers where a tenant's data is stored. The solution is efficient in terms of handling scale of data, and offering a low-latency solution.

Latency refers to the time it takes for data to travel from its source to its destination and back, in a network and in the context of distributed data storage in a public cloud network, latency refers to the delay or time it takes to retrieve data from a storage location over the network to the user who requested it.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system o FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Predictive Product Availability for Grocery Delivery; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("application store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer implemented method comprising:
   storing source data related to a plurality of tenants on a plurality of publishing servers, the plurality of tenants comprising targeted tenants and untargeted tenants, and the plurality of publishing servers comprising servers distributed over a plurality of geographical locations;
   sending metadata related to at least a first part of the source data related to the targeted tenants from the plurality of publishing servers to an aggregating server communicatively connected with the plurality of publishing servers;
   storing the metadata in a first database on the aggregating server, the database comprising a plurality of metadata segments arranged in a first sequenced array beginning with a first metadata segment and ending with a last metadata segment, the plurality of metadata segments having a corresponding plurality of state-indicating cursors arranged in a second sequenced array beginning with a first cursor and ending with a last cursor;
   storing the second sequenced array on a second database on the aggregating server;
   querying, from a subscribing server communicatively connected with the aggregating server, the first cursor of the second sequenced array, the subscribing server comprising targeted data related to at least a part of the plurality of tenants;
   querying, from the subscribing server, the metadata segment corresponding to the first cursor; and
   performing a predetermined operation on at least a part of the targeted data on the subscribing server, based on the queried metadata segment.

2. The method of claim 1 further comprising reporting the state indications of the cursors, and a plurality of statistical parameters associated with the state indications of the cursors to a process monitoring server communicatively connected with the aggregating server.

3. The method of claim 1, wherein the performing a predetermined operation on at least a part of the targeted data on the subscribing server comprises deleting the at least a part of the targeted data on the subscribing server.

4. The method of claim 1 further comprising:
   updating the state indication of the first cursor to indicate completion of the predetermined operation on the at least a part of the targeted data on the subscribing server;
   continuing, from the subscribing server, to query the next cursor, query the metadata segment corresponding to the next cursor, perform the predetermined operation on the queried metadata segment, and update the state indication of the next cursor, until the last cursor is reached; and
   displaying the state indications of the cursors on a viewing medium to a user.

5. The method of claim 1 further comprising:
   sending metadata related to at least a second part of the source data from the plurality of publishing servers;

extracting, cleaning, normalizing, converting, and formatting the metadata records into output data records of a predetermined format;

storing the output data records on the cloud server database;

generating a global view of an inventory of the tenants based on the output data records, the global view comprising current status of the targeted tenants and the untargeted tenants; and displaying the global view of the inventory of the tenants on a viewing medium to the user.

6. The method of claim 5, wherein the extracting, cleaning, normalizing, converting, and formatting the metadata records comprises running an Extract-Transform-Load (ETL) job on the metadata records using a predetermined data service.

7. The method of claim 5, wherein generating a global view of an inventory of the tenants comprises presenting the inventory of the tenants indexed by corresponding physical locations of the storage servers.

8. A computer implemented method comprising:

receiving metadata related to targeted data from a plurality of publishing servers;

storing the metadata in a first database, the first database comprising a plurality of metadata segments arranged in a first sequenced array beginning with a first metadata segment and ending with a last metadata segment, the plurality of metadata segments having a corresponding plurality of state-indicating cursors arranged in a second sequenced array beginning with a first cursor and ending with a last cursor;

storing the second sequenced array in a second database;

responsive to a first query, providing one or more responses comprising:

the first cursor of the second sequenced array; and a metadata segment corresponding to the first cursor;

the first cursor and metadata segment being sufficient for a recipient of the one or more responses to delete at least a part of the targeted data based on the metadata segment.

9. The method of 8, further comprising:

updating the state indication of the first cursor to indicate completion of the deletion on the at least a part of the targeted data on the subscribing server;

responsive to a second query, providing a second response comprising a next cursor of the second sequenced array and a metadata segment corresponding to the second cursor;

wherein the second cursor and metadata segment corresponding to the second cursor are sufficient for the recipient of the second response to delete at least another part of the targeted data.

10. A non-transitory machine-readable storage medium that provides instructions that, if executed by a processor, are configurable to cause said processor to perform operations comprising:

storing source data related to a plurality of tenants on a plurality of publishing servers the plurality of tenants comprising targeted tenants and untargeted tenants, and the plurality of publishing servers comprising servers distributed over a plurality of geographical locations;

sending metadata related to at least a first part of the source data related to the targeted tenants from the plurality of publishing servers to an aggregating server communicatively connected with the plurality of publishing servers;

storing the metadata in a first database on the aggregating server, the database comprising a plurality of metadata segments arranged in a first sequenced array beginning with a first metadata segment and ending with a last metadata segment, the plurality of metadata segments having a corresponding plurality of state-indicating cursors arranged in a second sequenced array beginning with a first cursor and ending with a last cursor;

storing the second sequenced array on a second database on the aggregating server;

querying, from a subscribing server communicatively connected with the aggregating server, the first cursor of the second sequenced array, the subscribing server comprising targeted data related to at least a part of the plurality of tenants;

querying, from the subscribing server, the metadata segment corresponding to the first cursor; and performing a predetermined operation on at least a part of the targeted data on the subscribing server, based on the queried metadata segment.

11. The non-transitory machine-readable storage medium of claim 10 further comprising reporting the state indications of the cursors, and a plurality of statistical parameters associated with the state indications of the cursors to a process monitoring server communicatively connected with the aggregating server.

12. The non-transitory machine-readable storage medium of claim 10, wherein the performing a predetermined operation on at least a part of the targeted data on the subscribing server comprises deleting the at least a part of the targeted data on the subscribing server.

13. The non-transitory machine-readable storage medium of claim 10 further comprising:

updating the state indication of the first cursor to indicate completion of the predetermined operation on the at least a part of the targeted data on the subscribing server;

continuing, from the subscribing server, to query the next cursor, query the metadata segment corresponding to the next cursor, perform the predetermined operation on the queried metadata segment, and update the state indication of the next cursor, until the last cursor is reached; and displaying the state indications of the cursors on a viewing medium to a user.

14. The non-transitory machine-readable storage medium of claim 10 further comprising:

sending metadata related to at least a second part of the source data from the plurality of publishing servers;

extracting, cleaning, normalizing, converting, and formatting the metadata records into output data records of a predetermined format;

storing the output data records on the cloud server database;

generating a global view of an inventory of the tenants based on the output data records, the global view comprising current status of the targeted tenants and the untargeted tenants; and displaying the global view of the inventory of the tenants on a viewing medium to the user.

15. The non-transitory machine-readable storage medium of claim 14, wherein the extracting, cleaning, normalizing, converting, and formatting the metadata records comprises running an Extract-Transform-Load (ETL) job on the metadata records using a predetermined data service.

16. The non-transitory machine-readable storage medium of claim 14, wherein generating a global view of an inventory of the tenants comprises presenting the inventory of the tenants indexed by corresponding physical locations of the storage servers.

17. A system comprising:
a processor;
a plurality of publishing servers digitally connected with the processor, the plurality of publishing servers comprising storage servers distributed over a plurality of geographical locations;
an aggregating server communicatively connected with the plurality of publishing servers;
a subscribing server communicatively connected with the aggregating server;
a non-transitory machine-readable storage medium that provides instructions that, if executed by the processor, are configurable to cause the system to perform operations comprising:
storing source data related to a plurality of tenants on a plurality of publishing servers the plurality of tenants comprising targeted tenants and untargeted tenants, and the plurality of publishing servers comprising servers distributed over a plurality of geographical locations;
sending metadata related to at least a first part of the source data related to the targeted tenants from the plurality of publishing servers to an aggregating server communicatively connected with the plurality of publishing servers;
storing the metadata in a first database on the aggregating server, the database comprising a plurality of metadata segments arranged in a first sequenced array beginning with a first metadata segment and ending with a last metadata segment, the plurality of metadata segments having a corresponding plurality of state-indicating cursors arranged in a second sequenced array beginning with a first cursor and ending with a last cursor;
storing the second sequenced array on a second database on the aggregating server;
querying, from a subscribing server communicatively connected with the aggregating server, the first cursor of the second sequenced array, the subscribing server comprising targeted data related to at least a part of the plurality of tenants;
querying, from the subscribing server, the metadata segment corresponding to the first cursor; and
performing a predetermined operation on at least a part of the targeted data on the subscribing server, based on the queried metadata segment.

18. The system of claim 17 further comprising reporting the state indications of the cursors, and a plurality of statistical parameters associated with the state indications of the cursors to a process monitoring server communicatively connected with the aggregating server.

19. The system of claim 17, wherein the performing a predetermined operation on at least a part of the targeted data on the subscribing server comprises deleting the at least a part of the targeted data on the subscribing server.

20. The system of claim 17 further comprising:
updating the state indication of the first cursor to indicate completion of the predetermined operation on the at least a part of the targeted data on the subscribing server;
continuing, from the subscribing server, to query the next cursor, query the metadata segment corresponding to the next cursor, perform the predetermined operation on the queried metadata segment, and update the state indication of the next cursor, until the last cursor is reached; and
displaying the state indications of the cursors on a viewing medium to a user.

21. The system of claim 17 further comprising:
sending metadata related to at least a second part of the source data from the plurality of publishing servers;
extracting, cleaning, normalizing, converting, and formatting the metadata records into output data records of a predetermined format;
storing the output data records on the cloud server database;
generating a global view of an inventory of the tenants based on the output data records, the global view comprising current status of the targeted tenants and the untargeted tenants; and
displaying the global view of the inventory of the tenants on a viewing medium to the user.

22. The system of claim 21, wherein the extracting, cleaning, normalizing, converting, and formatting the metadata records comprises running an Extract-Transform-Load (ETL) job on the metadata records using a predetermined data service.

23. The system of claim 21, wherein generating a global view of an inventory of the tenants comprises presenting the inventory of the tenants indexed by corresponding physical locations of the storage servers.

* * * * *